United States Patent [19]

Jensen et al.

[11] Patent Number: 5,005,439
[45] Date of Patent: Apr. 9, 1991

[54] INERTIA FORCE GENERATING DEVICE

[75] Inventors: William S. Jensen, Canoga Park; David Ng, Arcadia, both of Calif.

[73] Assignee: Barry Wright Corporation, Watertown, Mass.

[21] Appl. No.: 379,881

[22] Filed: Jul. 14, 1989

[51] Int. Cl.⁵ .................... F16F 15/10; G01H 11/00
[52] U.S. Cl. ........................... 74/574; 73/660; 73/667; 74/61; 74/87; 74/573 R; 248/550
[58] Field of Search ............... 74/574, 573 R, 61, 87; 73/468, 660, 667, 668; 248/550, 638

[56] References Cited

U.S. PATENT DOCUMENTS

| | | | |
|---|---|---|---|
| 2,248,182 | 7/1941 | Mateer | 74/61 |
| 2,627,849 | 2/1953 | Carlson | 74/61 X |
| 2,964,272 | 12/1960 | Olson | 248/550 |
| 3,039,609 | 6/1962 | Lippmann | 209/366.5 X |
| 3,208,292 | 9/1965 | Austin | 74/61 |
| 3,209,525 | 10/1965 | Karlsson | 56/296 |
| 3,339,422 | 9/1967 | Petrin | 74/87 |
| 3,952,612 | 4/1976 | Kurkowski et al. | 74/573 R |
| 4,018,290 | 4/1977 | Schmidt | 173/49 |
| 4,033,541 | 7/1977 | Malueg | 248/550 |
| 4,289,042 | 9/1981 | Brown | 74/61 |
| 4,561,319 | 12/1985 | Lilja | 74/61 |
| 4,615,504 | 10/1986 | Sandercock | 248/550 |
| 4,635,892 | 1/1987 | Baker | 248/550 |
| 4,677,532 | 5/1987 | Holz et al. | 74/573 R |
| 4,688,355 | 8/1987 | Menigat et al. | 51/169 |
| 4,795,123 | 1/1989 | Forward et al. | 248/550 |

Primary Examiner—Allan D. Herrmann
Attorney, Agent, or Firm—Quarles & Brady

[57] ABSTRACT

An inertia force generating device comprises two pairs of coaxial counterrotating eccentric rotors, whose rotational speeds and relative positons are automatically and continuously controlled so as to cancel undesirable vibrations produced by another device. Within each rotor pair, the two rotors have an adjustable angle between their mass centers, so that the effective eccentricity of the pair can be varied, and the phase between the two pairs can also be changed, to alter the direction of the maximum or minimum inertial forces developed. The four rotors include shells of different diameter, nested together on a center plane of the device, or parallel plates configured to maintain a minimum spread of mass centers along the rotational axis.

17 Claims, 6 Drawing Sheets

INERTIA FORCE GENERATING DEVICE

BACKGROUND OF THE INVENTION

This invention relates to the field of vibration control, and particularly to an active inertial force generator capable of developing periodic forces of controllable frequency, amplitude, direction and phase, for cancelling undesirable vibrations developed by aircraft engines or the like.

For controlling the generation or transmission of vibrations developed by machinery, various schemes and mechanisms are well known. These fall generally into categories of (1) passive vibration dampers, such as flywheel dampers, (2) vibration isolators, such as shock mounts, (3) hydraulic vibrators for generating periodic forces to counteract undesirable vibrations, and (4) mechanical active vibration compensators. The present invention is in the last group. Within that group, there are prior disclosures of devices which are either reciprocating or rotary. U.S Pat. No. 3,208,292, for example, discloses a variable force oscillator comprising four imbalanced flywheels arranged in counter-rotating pairs on two parallel axes; a differential gear arrangement permits one to change the angle between the eccentrically weighted portions, and thus change the magnitude of the vibration developed. U.S. Pat. Nos. 3,209,525, 4,289,042 and 4,667,532 show arrangements with two or three eccentric weights. With none of these devices, however, can one simultaneously control the frequency, magnitude and direction of the generated forces, or correct the phase between another source of vibration and the device. U.S. Pat. No. 4,688,355 does show an automatic balancer of the hydraulic type for grinding machines, but it requires a stationary fixture for hydraulic pressure to act against, and is not capable of developing an inertial force for compensating or cancelling vibrations developed by another device.

None of the prior devices is capable of simultaneously altering the magnitude, frequency, phase, and direction of its vibrational forces while in operation. In short, the problem of producing compensating periodic forces of readily changeable frequency, magnitude, direction and phase is a problem only partially addressed by the prior art, and was never heretofore solved.

In view of the foregoing, it is an object of this invention to generate periodic inertial forces for cancelling engine vibrations and the like, which may have varying frequency, magnitude and direction.

Another object is to provide a system for maintaining proper phase between the cancelling forces and the undesired vibration.

A further object is to provide a rotary mechanical vibration canceller with plural rotors nested in a common plane, so as to produce force vectors only in that plane.

Yet another object is to control a vibration cancelling device automatically in response to sensed vibrations in the environment of the device, so as to match the inertial forces of the device to those of the environment.

SUMMARY OF THE INVENTION

The above objectives are met by an inertial force generating device for producing forces to cancel undesired vibrations, comprising a stationary housing, first and second pairs of eccentrically weighted rotors disposed within the housing for rotation around an axis common to all the rotors, means for rotating the rotors within the housing, and means for controlling the angle between the mass centers of the two eccentrics within each of the rotor pairs, so as to vary the effective mass eccentricity of each of the pairs, wherein the rotors include imbalanced portions, all of which are nested radially, so as to generate centrifugal force vectors in a common plane perpendicular to the axis of rotation.

In an alternative configuration, the imbalanced portions are in the form of parallel plates, placed side by side along the axis of rotation and as close as possible to one another and perpendicular to the axis of rotation.

BRIEF DESCRIPTION OF THE DRAWINGS

In the accompanying drawings.

DESCRIPTION OF THE PREFERRED EMBODIMENT

Figure 1A:
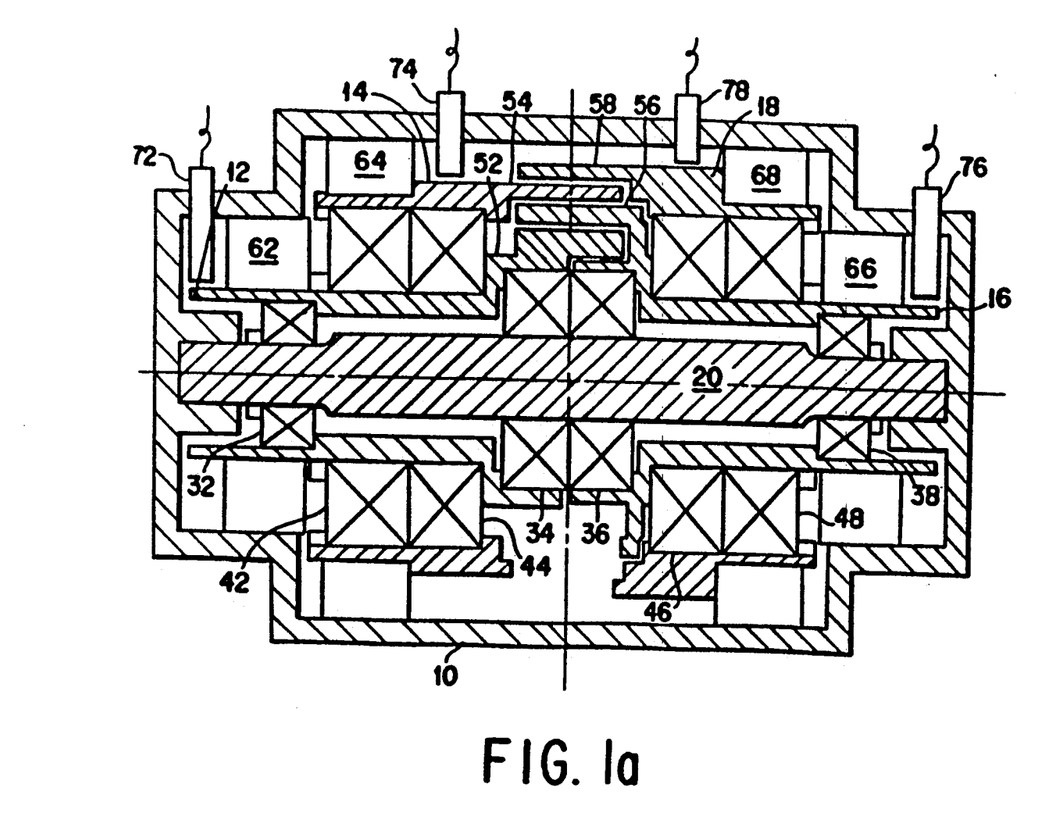
FIG. 1a is a sectional view of a device embodying the invention, taken along diametral plane thereof.

The invention is embodied in an inertial force generating device shown in the drawings. With reference to FIG. 1a, the device comprises a housing 10 containing two pairs of rotors 12,14 and 16,18 mounted concentrically around a common shaft 20 for rotation thereabout. Each of the inner rotors is supported upon the shaft 20 by an inner pair of antifriction bearings; in FIG. 1a, the left pair of inner bearings supporting the rotor 12 are identified by numerals 32,34 and the right pair 36,38 support the rotor 16.

The two outer rotors 14,18 are supported by respective outer pairs of antifriction bearings, the left pair being designated by 42,44 and the right pair by 46,48.

Each rotor comprises a drive sleeve of a first diameter integrally connected by an annular shoulder to a shell of a somewhat greater diameter. The four shells, designated 52,54,56 and 58 in FIG. 1a, are of sufficiently different diameters that the shells nest within one another around a common plane perpendicular to, and bisecting, the longitudinal axis of the device. The outer diameter of one shell is less than the inner diameter of the shell around it, leaving an air gap so that none of the shells contacts its neighbor. Thus, there is no mechanical connection between the shells. A segment of each shell is cut away, leaving eccentric portions 60 of the shell (FIG. 2) which provide the desired eccentricity. The dimensions of the shells (diameter and thickness) and of the eccentric portions (segment angle and length) are chosen so that the mass eccentricity of the shells is identical, despite their different diameters. By "mass eccentricity" is meant the mass of the shell multiplied by the radial distance of its center of mass from the rotational axis. The centers of mass, one of which is shown, designated by reference letter M in FIG. 2, lie on or near a common plane perpendicular to the common axis of the rotors, so that the effective net inertial forces they produce are substantially within that plane.

Referring again to FIG. 1a, an annular, variable speed drive motor is connected to each of the rotors; the motors are designated 62,64,66,68 for the rotors 12,14,16,18 respectively. Each motor has a stationary portion connected to a stationary portion (either the housing 10 or the shaft 20) of the device, and a movable portion connected to the respective rotor.

Figure 1B:
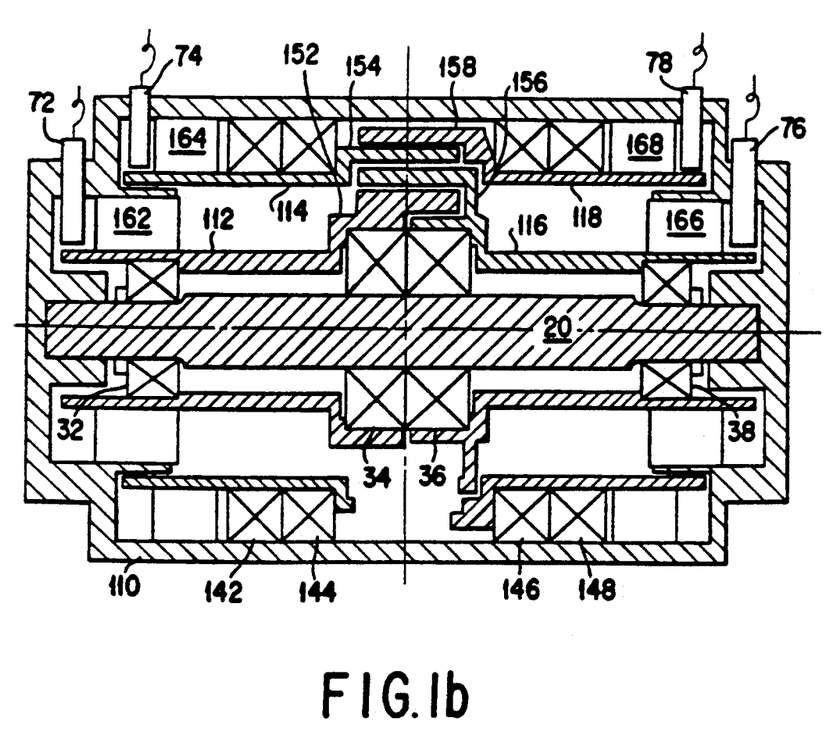
FIG. 1b is an alternative embodiment thereof.

FIG. 1b shows an alternative embodiment of the device, which differs from that of FIG. 1a primarily in the arrangement of bearings supporting the outer rotors. Parts identical to those of FIG. 1a are indicated by identical reference numerals, and counterpart, non-identical components are designated by reference numerals differing from those of FIG. 1a by a hundred. The two outer rotors 114,118 are supported by respective outer pairs of anti-friction bearings, the left pair being designated 142,144 and the right pair by 146,148. As the arrangement of rotors and the function of the embodiments are identical, FIG. 1a is not discussed further.

Figure 2:
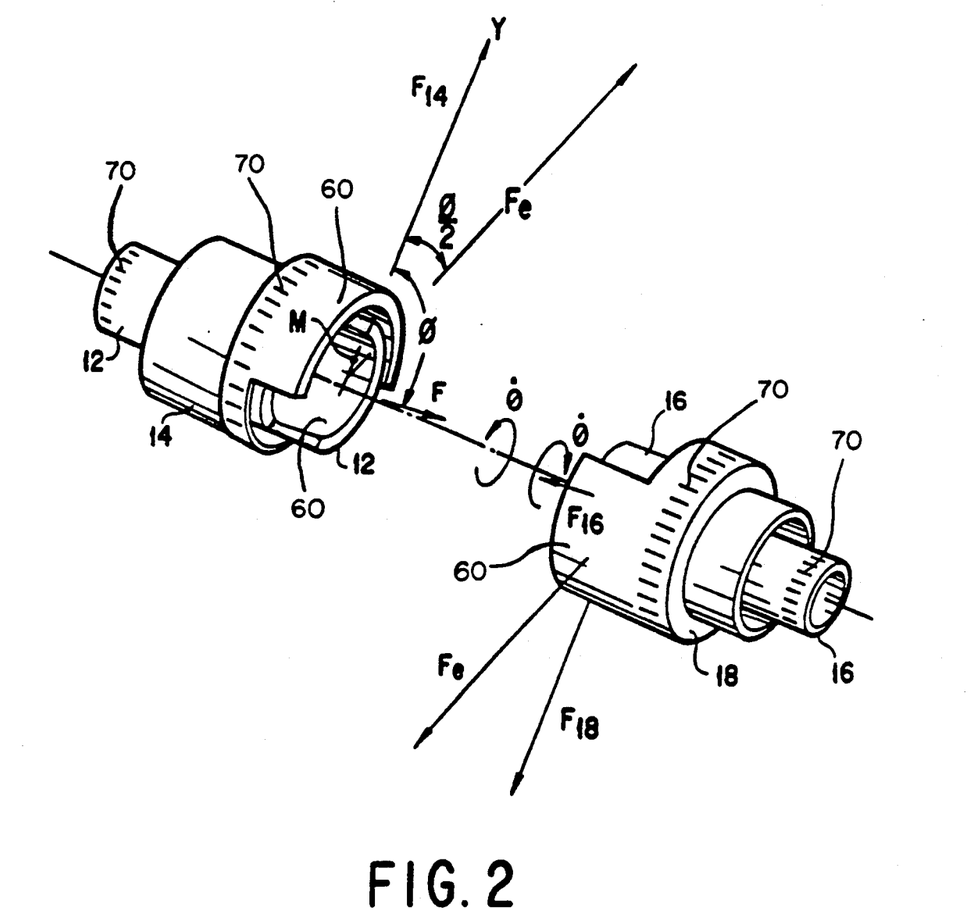
FIG. 2 is an exploded perspective view of the device shown in FIG. 1a, with the casing and other parts omitted for clarity.

With reference to FIG. 2, each rotor is provided with circumferentially spaced markings or magnets (generically "triggers" in the claims that follow) 70 on its outer surface, in the vicinity of means for detecting passage thereof to develop signals from which the speed and angular position of the particular rotor can be inferred. The sensors, designated 72,74,76,78 in FIG. 1, may be optical or magnetic, and are mounted in apertures in the housing.

Figure 3A:
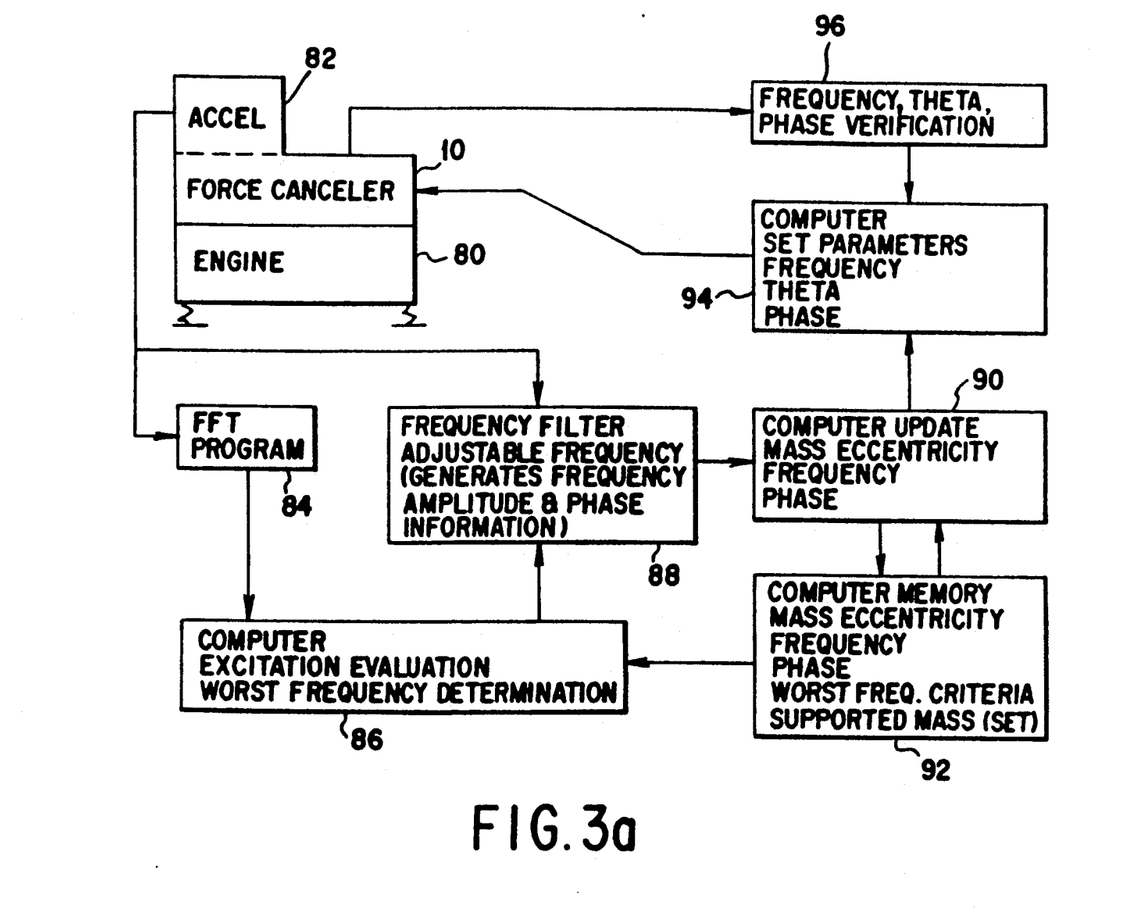
FIG. 3a is a diagram showing major components of a system for controlling the device, when mounted on an engine so as to cancel vibrations generated by the engine.

FIG. 3a depicts the inertial force generating device 10 mounted upon an engine 80 that may produce objectionable vibrations of varying frequency, magnitude, and direction. An accelerometer 82 is mounted on the device 10, on the engine in the vicinity of the device, or on the structure remote from the device. When two accelerometers are utilized, they are typically, but not necessarily, mounted in the force plane, and mutually orthogonal. Alternate sensor schemes might include geophones or microphones, depending on the application. Output from the accelerometer is directed to an FFT program module 84 which takes the time domain vibration information and converts it into the frequency domain. The program prepares the information for the excitation evaluation program 86 which takes the frequency domain information from the FFT program and deletes the effect of the force canceller, then applies evaluation criteria to the results to determine which vibration to eliminate. The output of the program 86 is filtered by an adjustable frequency filter 88, providing a clear signal for phasing and mass-eccentricity adjustment by the computer update program 90 that calculates the mass eccentricity and frequency required to cancel the undesired vibration. Data from program 90 is stored in memory 92; stored values may be accessed by the computer 86. Program module 94 receives signals both from the module 90 and from a module 96 which verifies frequency, offset angle $\theta$ and phase information from the sensors 72,74, 76,78 of the device 10. The module 90 then generates motor drive signals necessary to change the frequency (speed), offset angle $\theta$ and phase (with respect to the engine) of the device 10.

Figure 3B:
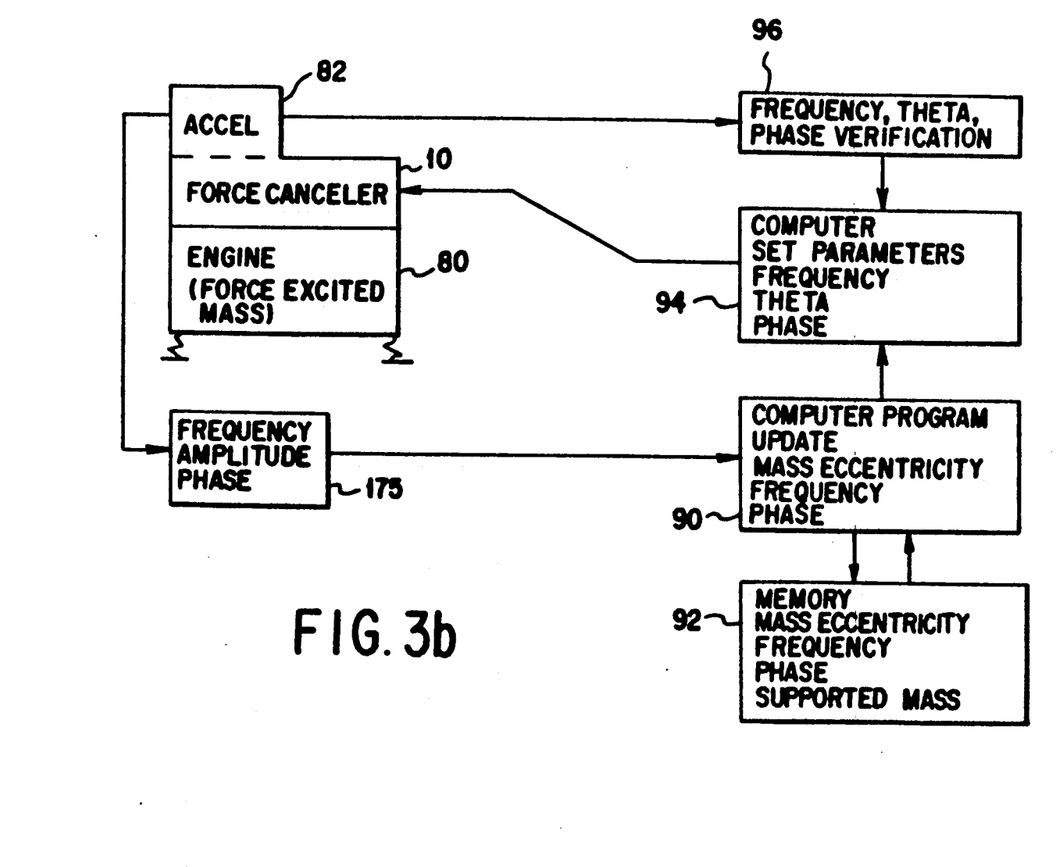
FIG. 3b is an alternative embodiment thereof.

A simplified form of the automatic control system is shown in FIG. 3b, where similar computer program modules are provided, except that the items 84,86,88 of FIG. 3a are replaced by a single module 175. The simplified arrangement is otherwise identical to that described above, and performs the same function; i.e., that of matching the frequency, amplitude, direction, and phase of the generated vibrational force to that of the engine 80.

In operation, the computer 94, in conjunction with a power supply, provides power to the four motors of the device, driving the rotors to a desired, synchronized speed in relation to that of the engine, generally equal to the engine speed or an integral fraction thereof. The left pair 12,14 of rotors are rotated in one direction, and the right pair are turned in the opposite direction, at the same speed. In FIG. 2, the inertial force vector generated by each rotor shell is designated F with a subscript corresponding to the particular shell; the inertial forces of the individual eccentrics produce a net effective force Fe whose magnitude and direction depends upon the magnitude and angular offset angle $\theta$ the individual forces. When angle $\theta$ equals 180°, the mass centers of the two rotors are opposed, and thus the effective eccentricity of the pair is zero, while when they are aligned ($\theta$ equals 0°), the mass eccentricity is at a maximum. Thus, by varying the angular offset angle $\theta$ between the center of mass radii, the magnitude of the inertial force generated by the paired rotors can be controlled.

The offset angles of the two pairs could be independently controlled at different values; when the offsets of both pairs are kept substantially identical, purely reciprocating sinusoidal net forces result. When the offsets of both pairs are different, an eccentric force that changes magnitude with angular orientation is generated.

The direction of the generated peak inertial force is controlled by controlling the phase difference between the two rotor pairs. As the rotor pairs rotate within the housing, their effective mass centers are aligned at two opposed points during each revolution. At the points where the effective mass centers of the oppositely rotating first and second rotor pairs are in alignment, the inertial force of the combination is the greatest; it is minimum or zero where the mass centers are 180° opposed, substantially as shoWn in FIG. 2. By controlling the phase relationship between the right and left rotor pairs, the angular position of the alignment point with respect to the stationary housing can be set; as a consequence, the orientation of the generated minimum and maximum force vectors can be changed at will.

In order for the device described above to accomplish the objective of cancelling vibrations developed by the engine upon which it is mounted, the phase between the rotors and the engine is automatically adjusted, by the control system, so that the peaks of the inertial forces generated by the device are in proper phase with (opposing) those of the engine.

The frequency of the developed inertial force is altered by changing the speed of the rotors. Therefore, the frequency, amplitude and direction of the developed maximum and minimum inertial forces, in addition to their phase with respect to that of its environment, are continuously controllable as the device operates.

Figure 4:
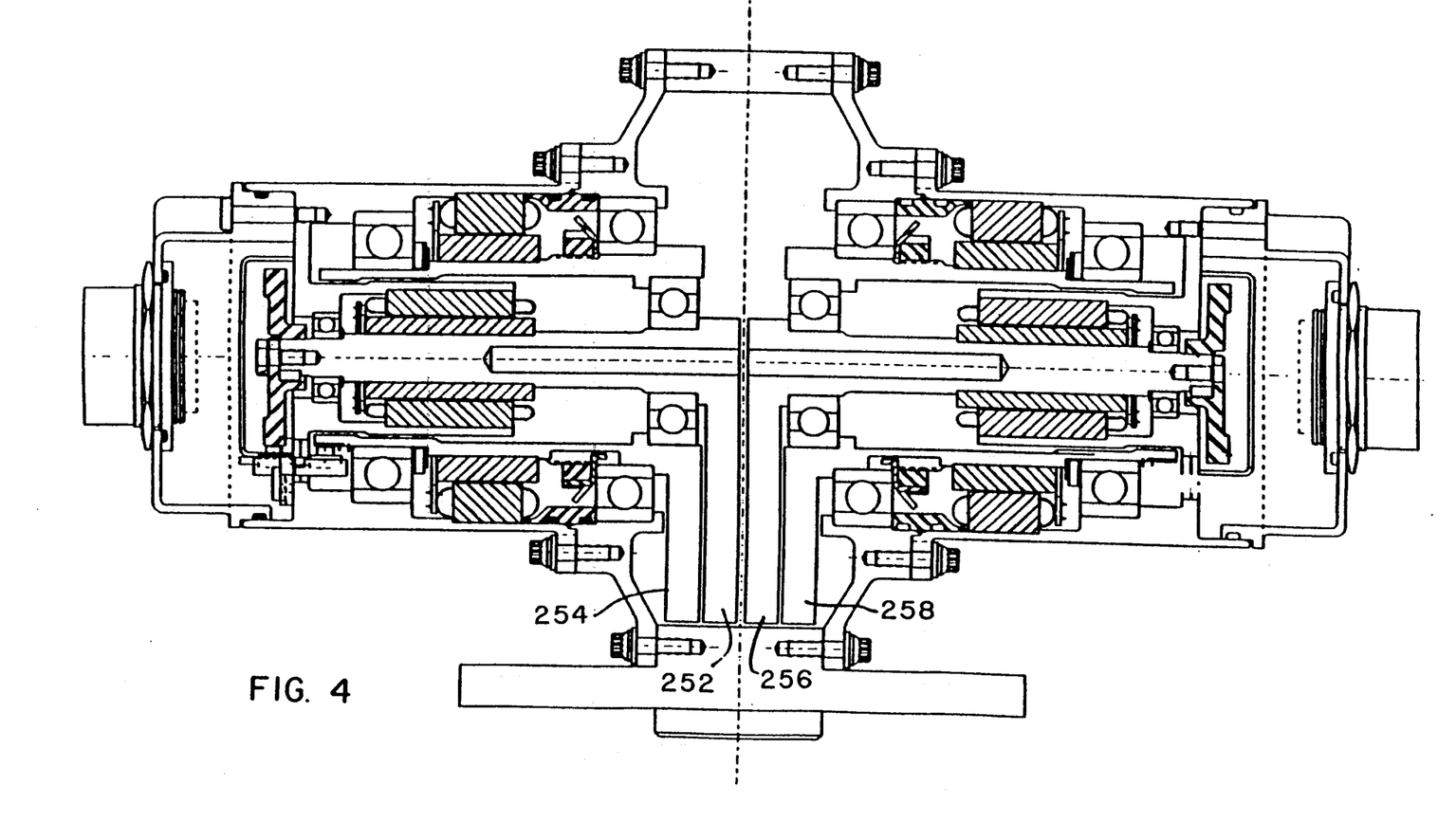
FIG. 4 is a view corresponding to FIG. 1a, of a second alternative embodiment.

FIG. 4 shows another alternative embodiment of the invention, wherein the rotors, instead of being in the form of nested shells (which enables all eccentric mass centers to lie in a common plane) are instead parallel eccentric plates 252, 254, 256 and 258, the plates being as thin and as close together as possible so as to produce forces nearly within a common plane. The goal of obtaining resultant forces in a common plane is approximately met with this embodiment.

It should be understood that the described use of the subject device, on an engine, is only illustrative, and that the device may be used in any environment where there is a periodic, monitorable, vibration of frequency and magnitude within the range of magnitudes and frequencies achievable by the device. To modify the device described above, in order to adapt to particular frequency and magnitude ranges, is considered within the skill of the artisan, as are details of the control systems illustrated in FIG. 3a and 3b.

Although two pairs of rotors are preferred for carrying out the invention, even multiples of four could be used as well.

Inasmuch as the invention is subject to these and other variations, it is intended that the foregoing description shall be interpreted only as illustrative of the invention described by the following claims.

We claim:

1. An inertial force generating device for producing periodic forces to cancel undesired vibrations, comprising:
   a stationary housing;
   first and second pairs of eccentric rotors disposed within said housing for rotation around an axis common to all of said rotors, each rotor having an imbalanced portion with a respective eccentric center of mass, said imbalanced portions being nested radially, so as to develop force vectors in a common plane perpendicular to said axis;
   means for rotating said rotor pairs in opposite directions;
   means for controlling the angle between the mass centers of the rotors within each rotor pair, so as to vary an effective mass eccentricity of each; and
   means for adjusting the phase angle between the rotor pairs so as to control the direction of the cancelling force generated by the device.

2. The invention of claim 1, wherein all of said rotors have substantially identical mass eccentricity.

3. An inertial force generating device for producing periodic forces to cancel undesired vibrations, comprising:
   a stationary housing;
   first and second pairs of eccentric rotors disposed within said housing for rotation around an axis common to all of said rotors, each rotor having an imbalanced portion with a respective eccentric center of mass, said imbalanced portions being nested radially, so as to develop force vectors in a common plane perpendicular to said axis;
   means for rotating said rotor pairs in opposite directions; and
   means for controlling the angle between the mass centers of the rotors within each rotor pair, so as to vary an effective mass eccentricity of each of said pairs;
   wherein;
   all of said rotors have substantially identical mass eccentricity; and
   each of said imbalanced portions comprises an unbalanced shell, said shells being concentric and out of contact with one another, so as to be independently rotatable.

4. The invention of claim 3, wherein the rotating means comprise plural motors, each motor being connected to a respective one of said rotors.

5. The invention of claim 4, wherein all of said motors rotate said rotors at the same absolute speed.

6. The invention of claim 5, wherein each of said shells has a primary plane in which its center of mass lies, and further comprising means for varying the angular offset between the primary planes of the rotors within each of said pairs.

7. The invention of claim 5, wherein the means for controlling the angle between the mass centers of the rotors within each rotor pair maintains a different offset in each rotor pair for the generation of eccentric forces of constantly varying magnitude.

8. An inertia force generating device for producing periodic forces to cancel undesired vibrations, comprising:
   a stationary housing;
   first and second pairs of eccentric rotors disposed within said housing for rotation around an axis common to all of said rotors, each rotor having an imbalanced portion with a respective eccentric center of mass, said imbalanced portions being nested radially, so as to develop force vectors in a common plane perpendicular to said axis;
   means for rotating said rotor pairs in opposite directions;
   means for controlling the angle between the mass centers of the rotors within each rotor pair, so as to vary an effective mass eccentricity of each of said pairs; and
   a shaft supported within said housing and extending along said common axis, each of said rotor pairs comprising an inner and an outer rotor, the inner rotor of each pair being supported by bearings on the shaft, and the outer rotor of each pair being supported by bearings on said housing.

9. The invention of claim 8, wherein the means for controlling the angle between the mass centers of the rotors within each rotor pair maintains substantially identical angular offsets in both rotor pairs.

10. The invention of claim 8, further comprising an accelerometer for measuring magnitude, direction and frequency of the undesired vibrations.

11. The invention of claim 10, further comprising:
    two pairs of sensors mounted upon the housing, one sensor for each of said rotors, for sensing circumferentially spaced markings on said rotors;
    means responsive to said sensors for determining the angular speed and position of each of said rotors; and
    means, responsive to both said determining means and said accelerometer, for controlling said rotating means, said controlling means comprising means for adjusting the speed, offset and phase of the rotors so as to cancel the undesired vibrations.

12. An inertia force generating device for producing periodic forces to cancel undesired vibrations, comprising:
    a stationary housing;
    first and second paris of eccentric rotors disposed within said housing for rotation around an axis common to all of said rotors, each rotor having an imbalanced portion with respective eccentric center of mass, said imbalanced portions being nested radially, so as to develop force vectors in a common plane perpendicular to said axis;
    means for rotating said rotor pairs in opposite directions;
    means for controlling the angle between the mass centers of the rotors within each rotor pair, so as to vary an effective mass eccentricity of each of said pairs;

wherein each of said rotors is provided with a series of circumferenctially spaced markings, and further comprising two pairs of sensors mounted upon the housing, one for each of said rotors, for sensing said markings as they pass by the sensors.

13. The invention of claim 12, further comprising means responsive to said sensors for determining the angular speed and position of each of said rotors.

14. The invention of claim 12, further comprising means for varying a point of alignment of the effective centers of mass of the two rotor pairs.

15. An inertial force generating device for producing periodic forces to cancel undesired vibrations, comprising a stationary housing, first and second pairs of eccentric rotors disposed within said housing for rotation around an axis common to all of said rotors, each rotor having an eccentric center of mass, means for rotating said rotor pairs in opposite directions, means for controlling the angle between the mass centers of the rotors within each rotor pair, so as to vary an effective mass eccentricity of each of said pairs, and means for adjusting the phase angle between the rotor pairs so as to control the direction of the force generating by the device, and wherein the rotors comprise closely adjacent respective plates each perpendicular to said axis, so as to develop force vectors nearly within a central plane perpendicular to said axis.

16. The invention of claim 15, further comprising means for adjusting the phase of the device with respect to that of the undesired vibration, so as to oppose and cancel the vibration.

17. A method of cancelling an undesired periodic vibration of determinable magnitude, frequency and direction, comprising the steps of providing a force cancelling device with two paris of independently rotatable eccentrically weighted rotors, each rotor having an eccentric center of mass, rotating said rotors about a common axis in synchronization with one another, while controlling their speed as a function of the frequency of the undesired vibration, adjusting the angle between the mass centers of the two rotors in each pair, so as to control the amplitude of the inertial force generated by the device, as a function of the magnitude of the undesired vibration, adjusting the phase angle between the two rotor pairs so as to control the direction of the cancelling force generated by the device, as a function of the direction of the undesired vibration, and adjusting the phase of the device with respect to that of the undesired vibration, so as to oppose and cancel said vibration.

* * * * *

UNITED STATES PATENT AND TRADEMARK OFFICE
CERTIFICATE OF CORRECTION

PATENT NO. : 5,005,439
DATED : April 9, 1991
INVENTOR(S) : William S. Jensen and David Ng It is certified that error appears in the above-identified patent and that said Letters Patent is hereby corrected as shown below:

| Column | Line | Change |
|--------|------|--------|
| 3 | 54 | "!o" to --to-- |
| 4 | 17 | "angle θ the" to --angle θ between the-- |
| 4 | 41 | "shoWn" to --shown-- |
| 5 | 34 | "each; and" to --each of said pairs; and-- |
| 5 | 57 | "wherein;" to --wherein:-- |
| 6 | 58 | "paris" to --pairs-- |
| 6 | 61 | "with respective" to --with a respective-- |
| 8 | 12 | "paris" to --pairs-- |

Signed and Sealed this

Fifteenth Day of September, 1992

*Attest:*

DOUGLAS B. COMER

*Attesting Officer*  *Acting Commissioner of Patents and Trademarks*